Dec. 26, 1967          L. E. ZERLAUT          3,360,164
FEEDING SYSTEM FOR A SWAGING OR TAPERING APPARATUS
Filed March 11, 1966          6 Sheets-Sheet 1
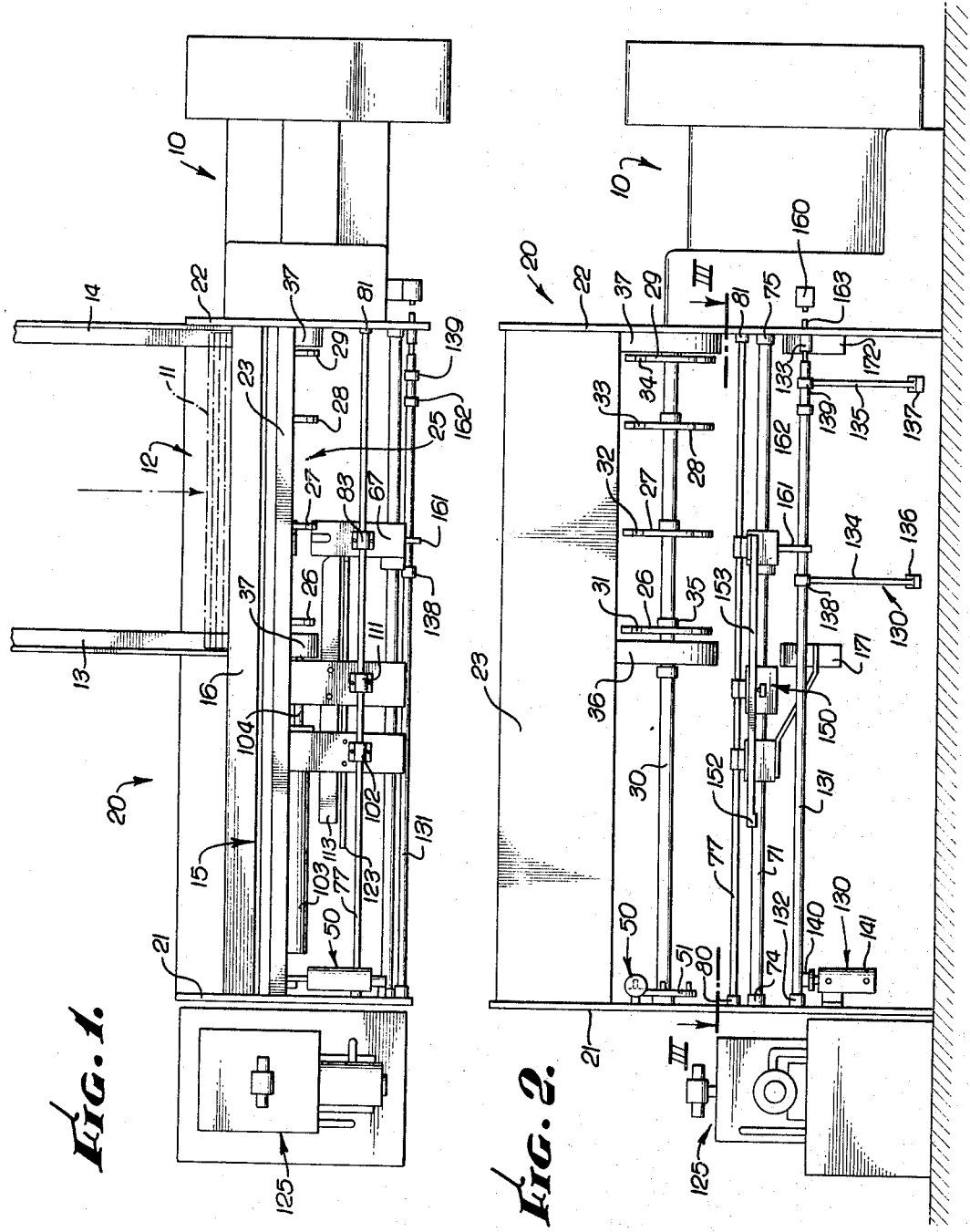
INVENTOR.
LEONARD E. ZERLAUT
By Mikette, Glenny, Poma & Smith
ATTORNEYS.

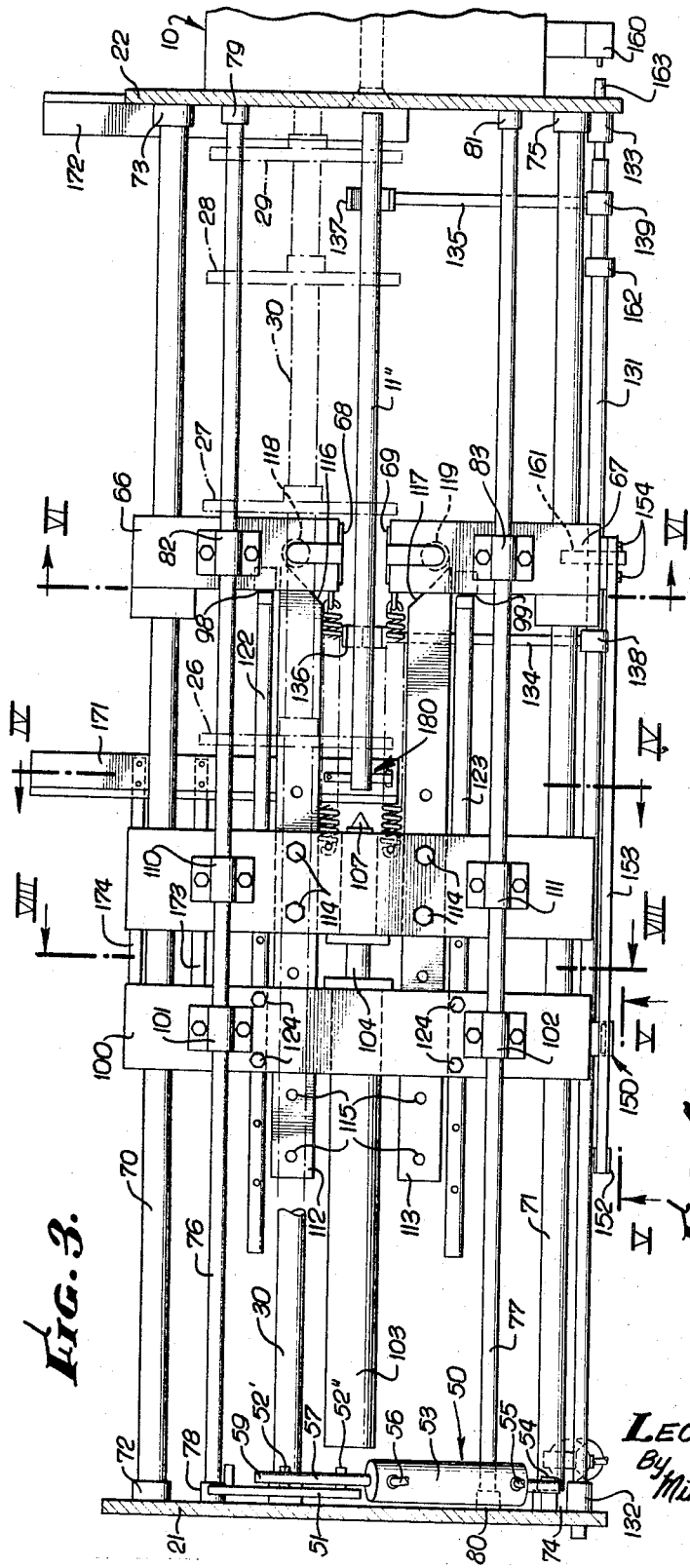

Dec. 26, 1967   L. E. ZERLAUT   3,360,164
FEEDING SYSTEM FOR A SWAGING OR TAPERING APPARATUS
Filed March 11, 1966   6 Sheets-Sheet 3
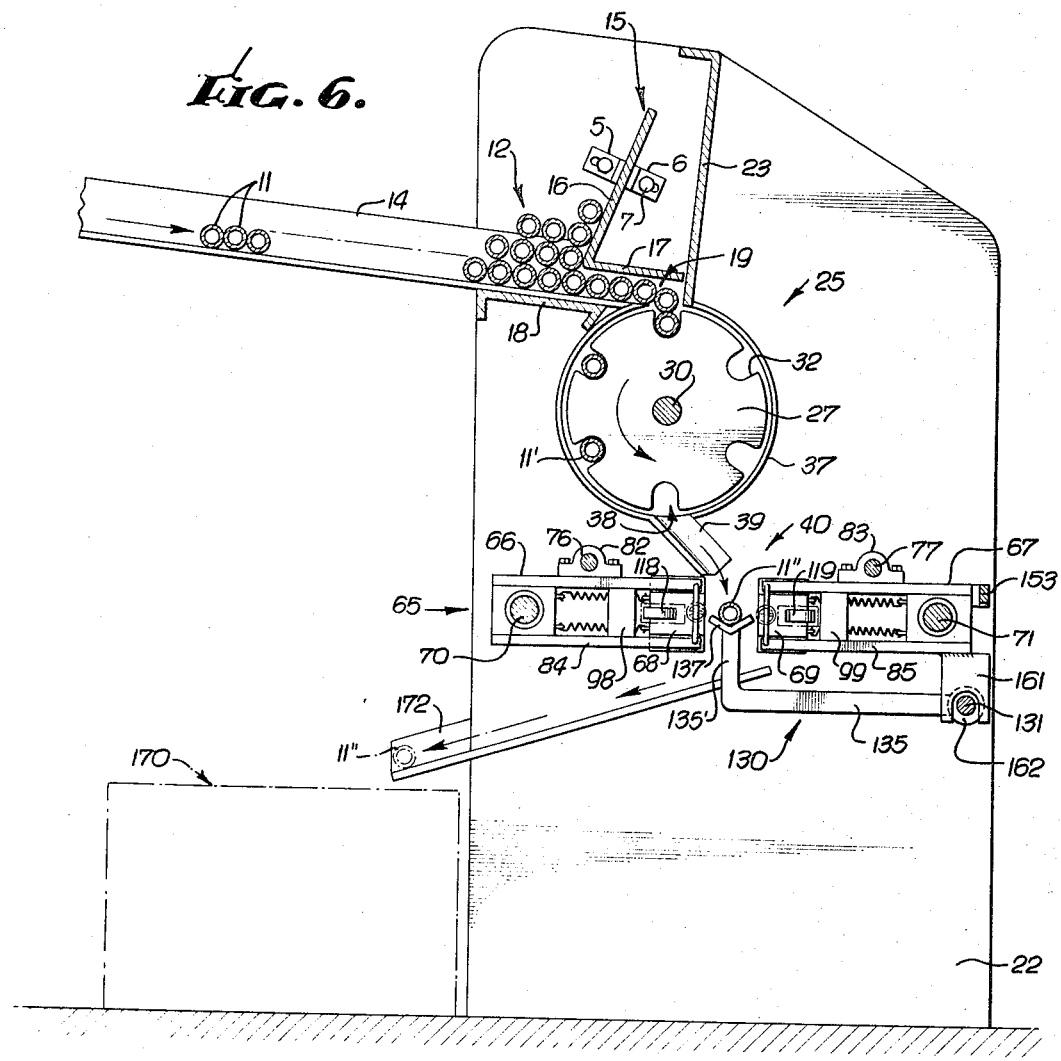
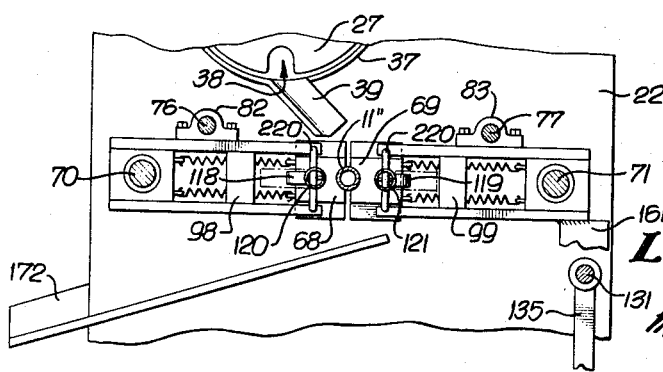
INVENTOR.
LEONARD E. ZERLAUT
By Miketta, Glenny, Poms & Smith
ATTORNEYS.

Dec. 26, 1967 L. E. ZERLAUT 3,360,164
FEEDING SYSTEM FOR A SWAGING OR TAPERING APPARATUS
Filed March 11, 1966 6 Sheets-Sheet 4

INVENTOR.
LEONARD E. ZERLAUT
By Miketta, Glenny, Poms & Smith
ATTORNEYS.

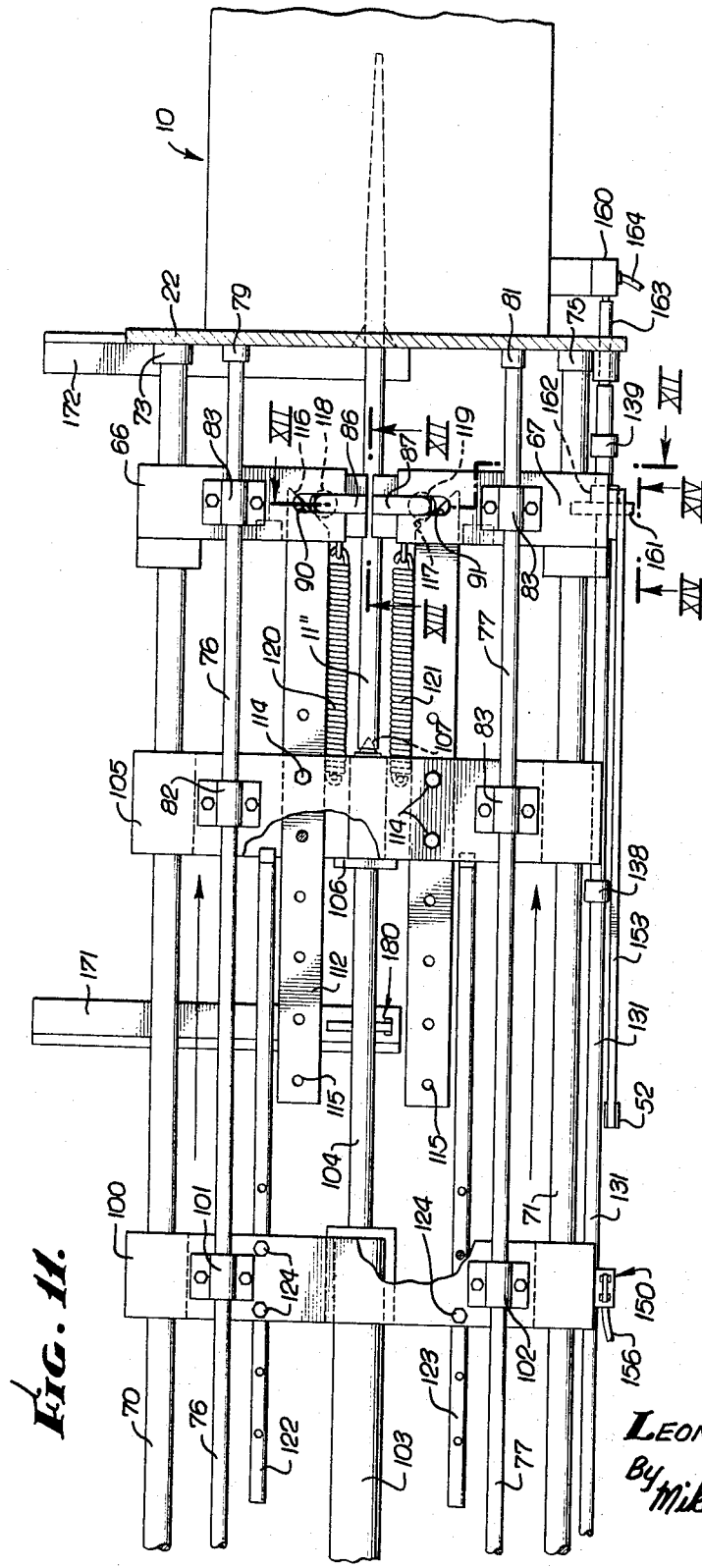
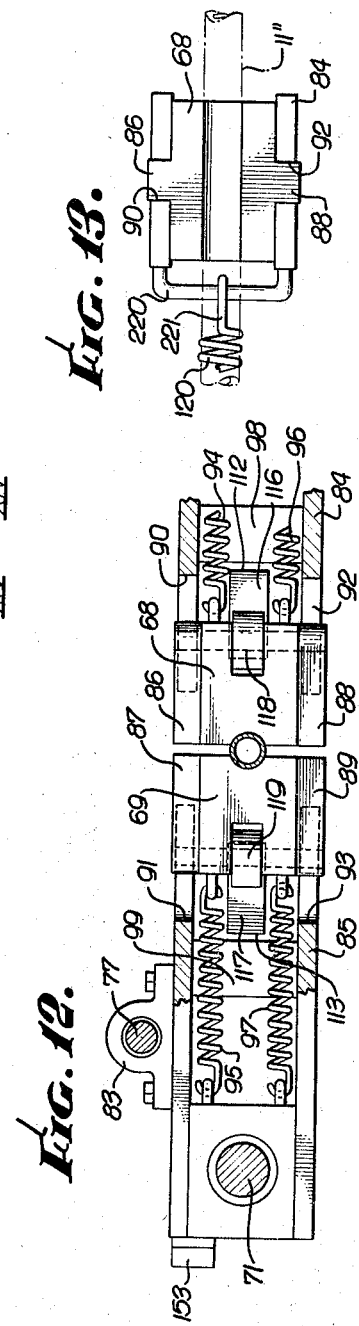

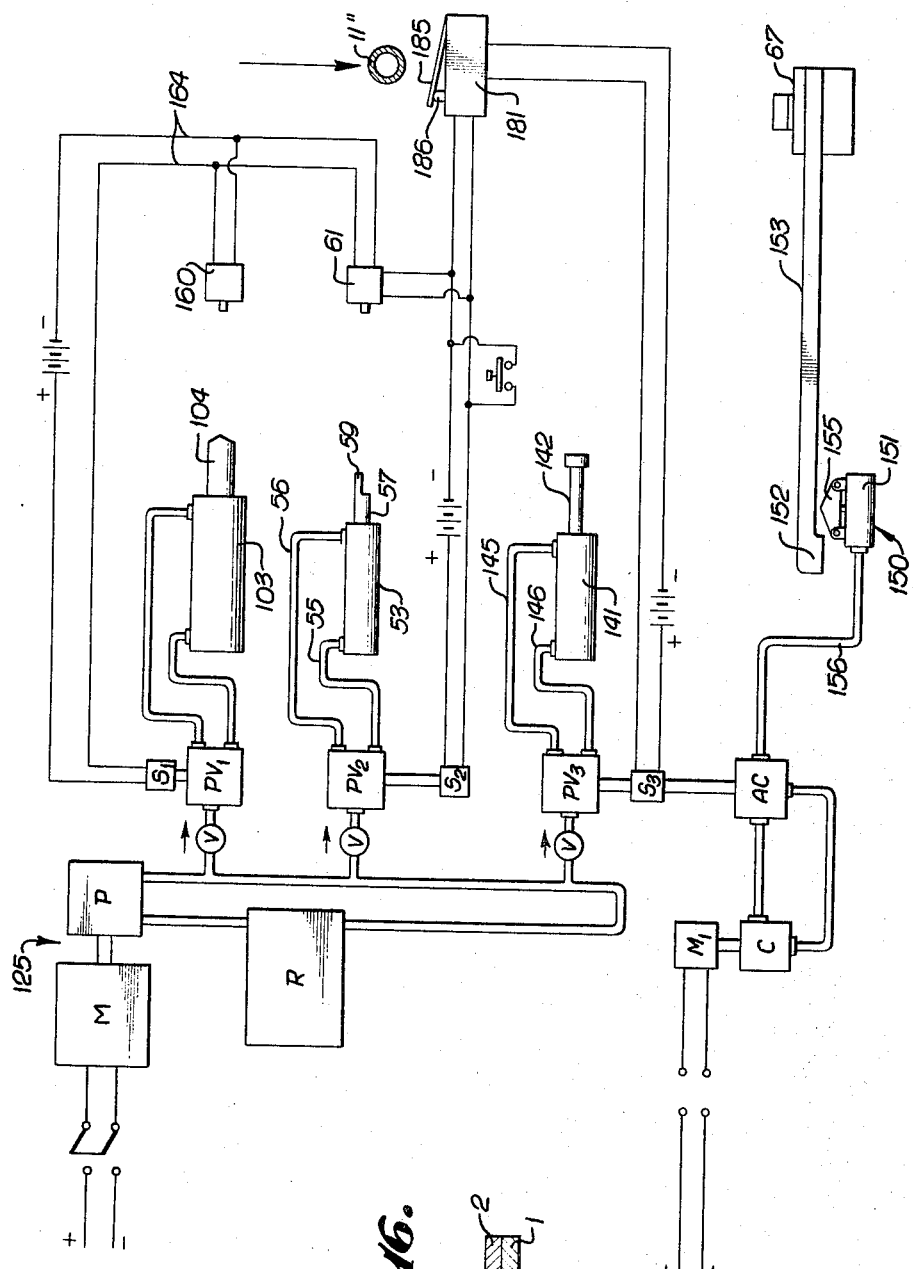

United States Patent Office 3,360,164
Patented Dec. 26, 1967

3,360,164
FEEDING SYSTEM FOR A SWAGING OR
TAPERING APPARATUS
Leonard E. Zerlaut, Santa Ana, Calif., assignor to
Manuel Izen, Los Angeles, Calif.
Filed Mar. 11, 1966, Ser. No. 533,593
5 Claims. (Cl. 221—239)

ABSTRACT OF THE DISCLOSURE

A work piece feeding apparatus to automatically feed individual work pieces in succession to a swaging or tapering machine and discharge the same therefrom wherein a feed means for separating a work piece from a supply thereof is provided for delivering individual work pieces into a work piece receiving zone of the apparatus positioning means are provided within such zone for receiving and positioning the individually delivered work piece, such positioning means being movable from an active position in such zone to an inactive position out of the zone, a movable work piece holding assembly is provided for grasping a work piece positioned by said positioning means which holds the work piece during movement of such positioning means to its inactive position, power operated drive means are provided for moving the work piece holding assembly relative to the associated swaging or tapering machine acting upon the work piece while it is held by the assembly, means are provided for operating the holding assembly to discharge a work piece therefrom on return movement of the assembly carrying the workpiece away from the swaging or tapering machine back into said zone, guide means are provided below said zone to guide work pieces as they are discharged from the holding assembly away from the apparatus and switch means are provided in association with the feed means and guide means for operating the feed means to deliver a next successive work piece into said zone and onto said positioning means in response to being engaged by a prior work piece discharged from the holding assembly toward the guide means. Automatic control means are also provided for moving the positioning means to an inactive position after a work piece is grasped by the holding assembly preparatory to its movement toward the associated swaging or tapering machine, and switch means are associated not only with the feed means and guide means, but also are associated with the automatic control means to return the positioning means to its active position ready to receive a next delivered work piece in response to being engaged by a prior work piece discharged toward the guide means, such automatic control means being actuated before the next successive work piece is actually delivered to said zone and the positioning means.

*Background of the invention*

This invention relates in general to an automatic feeding apparatus or system for feeding work pieces automatically and in succession into a machine to perform machining, forming, tapering or other material working operations on the work piece. More particularly, this invention relates to such an automatic feeding apparatus or system which is particularly adapted for use in feeding tubular, bar or elongate stock or work pieces into a swaging or tapering machine without the need for manual adjustment or attention during the successive operations thereof.

In many machining, forming and material working operations, particularly in swaging or tapering bar or tubular stock, it is desirable to use automatic feed apparatus or systems for moving the work piece or stock into the machine working thereon. In swaging or tapering the ends of long tubular or bar stock work pieces, it is particularly desirable to eliminate any manual handling thereof, not only because of the size and weight of such materials to be worked on, but in order to free the operator so that he may operate several machines rather than only one. It is conventional practice to feed tubular or bar stock held between a separable jaw assembly for work holding means into a rotary hammer swaging machine or the like automatically once the work piece or stock is held in the jaws. However, many manual operations have heretofore still been required in separating the work pieces from a stock pile thereof, positioning the work pieces between the jaw assemblies or work holding means and in initiating a next successive material working operation after the discharge of a work piece which has been completely worked by the swaging machine, or the like.

It is therefore the principal object of the present invention to disclose and provide a work piece feeding apparatus for automatically feeding individual work pieces in succession from a non-segregated supply thereof to a work piece holding assembly of a machine to act upon the work pieces in which manual attention is eliminated from the continued operation and the feeding apparatus continuously and successively feeds work pieces into the work piece holding assembly as finished work pieces are discharged from the machine acting thereon.

It is a primary object of the present invention to disclose and provide a work piece feeding apparatus as in the foregoing object wherein means are provided for separating a work piece from a supply thereof and which delivers such work piece individually into a work piece receiving zone to be positioned and held by the apparatus work piece holding assembly in response to the passage of the prior work piece being discharged from the work piece holding assembly.

It is another object of the present invention to disclose and provide a work piece feeding apparatus as in the foregoing objects wherein means are provided in the path of travel of a work piece discharged from the work holding assembly after it has been acted upon by the associated machine for operating a feed means for delivering a next successive work piece into a work piece receiving zone in which positioning means support the work piece until it is grasped or held by a work piece holding assembly of the associated machine to work or act upon the work piece.

It is also an object of the present invention to disclose and provide a means for positioning a work piece received from a supply thereof preparatory to its being grasped or held by a work holding assembly which is associated with and in part operated by a switch means placed in the path of travel of a prior discharged work piece in order that the positioning means become operable to position a next successive work piece in response to the travel of the prior discharged work piece toward a discharge zone or completed work piece storage or collecting zone.

It is a further object of the present invention to disclose and provide a control system for a work piece feeding apparatus employed in automatically feeding individual work pieces in succession from a supply thereof to a work piece holding assembly, into a machine to act upon the work pieces, the work pieces being subsequently discharged, wherein the control means is successively reactivated or cycled due to the discharge or passage through a discharge zone of a work piece which has been worked upon by the machine associated with the work piece feeding apparatus.

It is a still further object of the present invention to disclose and provide a feeding means as in the foregoing objects which includes indexing means for receiving and separating elongate tubular or bar stock work pieces from a supply thereof and intermittently moving to deliver such elongate work pieces into a work receiving zone therebelow, in part due to the forces acting thereon due to gravity, where such indexing means is associated with switch means positioned directed below the receiving zone which may be contacted by a discharged work piece received in said zone, worked upon by the associated machine and discharged from said receiving zone downwardly thereof due to the forces of gravity acting thereon.

These and various other objects as well as the many advantages of the work piece feeding apparatus or system, according to the present invention, will become readily apparent to those skilled in the art from a consideration of the following detailed explanation of an exemplary embodiment thereof. Reference will be made to the appended sheets of drawings in which:

FIG. 1 is a plan view of a work piece feeding apparatus or system for automatically feeding individual work pieces in succession from a non-segregated supply thereof to a work piece holding assembly of an exemplary swaging machine to act thereon, in accordance with the present invention;

FIG. 2 is an elevational view of the apparatus of FIG. 1;

FIG. 3 is a transverse section view of the apparatus of FIG. 2 taken therein along the plane III—III;

FIG. 4 is a cross-sectional view of the apparatus of FIG. 3 taken therein along the plane IV—IV;

FIG. 5 is a detail view of a portion of the apparatus of FIG. 3 taken therein along the plane V—V;

FIG. 6 is a cross-sectional view of the apparatus of FIG. 3 taken therein along the plane VI–VI;

FIG. 7 is a detail view of the apparatus of FIG. 6 showing the jaw assemblies in closed relation about an elongate tubular work piece;

FIG. 11 is a partially sectioned plan view of the apparatus of FIG. 3 showing a tubular work piece being advanced into an exemplary associated swaging machine;

FIG. 12 is a detail sectional view of the work holding means of the apparatus of FIG. 11 taken therein along the plane XII–XII;

FIG. 13 is a detail view of a jaw face of the work holding means of the apparatus of FIG. 11 taken therein along the plane XIII—XIII;

FIG. 15 is a detail view of a portion of the exemplary indexing means of the exemplary feed means for separating a work piece from a supply thereof and delivering it to a work piece receiving zone;

FIG. 16 is a sectional view of the apparatus of FIG. 15 taken therein along the plane XVI—XVI; and FIG. 17 is a schematical representation of the electrical, hydraulic and pneumatic control systems employed in the exemplary apparatus of FIGS. 1 through 14.

Figure 8:
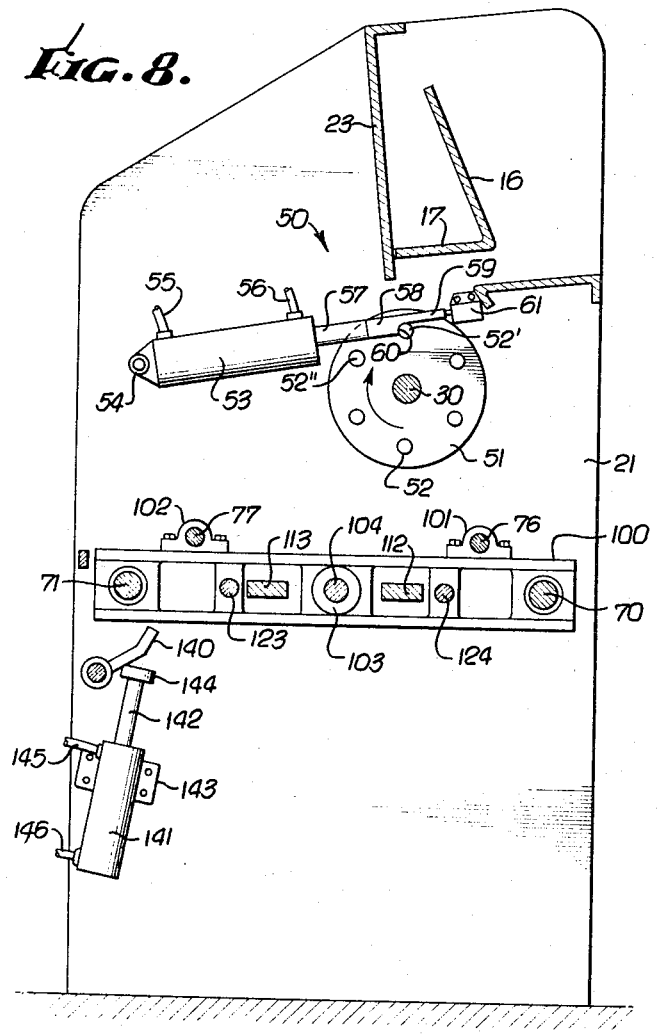
FIG. 8 is a cross-sectional view of the apparatus of FIG. 3 taken therein along the plane VIII—VIII.

Referring first to FIGS. 1 and 2, an exemplary embodiment of the automatic work piece feeding apparatus, according to the present invention, will be explained in detail. The exemplary work piece feeding apparatus is shown in use with a conventional swaging machine indicated generally at 10. Such swaging machine may be a conventional rotary swaging machine for pointing, tapering, forming or reducing tubing by impacting a plurality of radially mounted hammers about the end of tubing fed into the machine. The exemplary work piece feeding apparatus to be explained in detail herein, is intended for use in feeding tubing or other elongate stock or work pieces into the swaging machine. It should be apparent to those skilled in the art that the principles of operation and the construction employed in the present work piece feeding apparatus for feeding tubing can be modified or altered within the scope of the present invention to feed any work pieces into a machine to act thereon wherein the automatic feeding advantages of the present invention, are desired to be obtained.

The exemplary automatic work piece feeding apparatus, according to the present invention, is indicated generally at 20, in FIGS. 1 and 2 and is adapted to receive a non-segregated or merely stock piled supply of tubing 11 from a supply thereof, indicated generally at 12. The supply of tubing, indicated generally at 12, may be directed by spaced angle iron guide members 13 and 14 toward the work piece feeding apparatus feed means, indicated generally at 25.

Means are provided in association with the supply of tubing, indicated generally at 12, for marshalling or directing the individual tubes or work pieces 11 toward the feed means, indicated generally at 25, in single file order, as best seen in FIG. 6. In the exemplary embodiment, such means includes the provision of a vertically adjustable combination barrier and guide means indicated generally at 15. An upper inclined wall 16 is a barrier against which the supply of tubing, indicated generally at 12, rests. The lower wall 17 is spaced above the lower flanges of the angle iron guides 13 and 14, supported on a ledge 18 of the feeding apparatus, to guide the tubing or work pieces in a single file order toward the feed means, as indicated generally at 19. The combination barrier and guide means, indicated generally at 15, may be adjustable vertically between the side flanges 21 and 22 and relative to the vertical housing flange 23 of the work piece feeding apparatus frame. Any conventional means for adjustably mounting the barrier and guide means, indicated generally at 15, may be employed such as the provision of a stationary clamp 5 on one side of the wall 16 and a movable clamp 6 on the other side, movable clamp 6 being held in the desired clamp position by fastening means 7. Such clamp means may be provided upon each of the apparatus frame side flanges 21 and 22.

Feed means for separating a work piece from the supply of work pieces, indicated generally at 12 and 19, are provided for delivering individual work pieces into a work piece receiving zone of the apparatus or machine associated therewith in which the work piece is grasped or held by a work piece holding assembly of the apparatus or associated machine. In the exemplary embodiment, such feed means includes the provision of a plurality of individual indexing means having a plurality of aligned work piece receiving slots to separate individual tubular work pieces from the supply, indicated generally at 12 and 19, and deliver them into a work piece receiving zone, indicated generally at 40 in FIG. 6. The exemplary indexing means, as best seen in FIG. 2, include the plurality of discs 26, 27, 28 and 29 mounted in a longitudinally extending series. The discs 26 through 29 are axially spaced upon mounting means including, in the exemplary embodiment, the feed means main shaft 30 which is rotatably mounted to the apparatus frame side flanges 21 and 22 by conventional journal means. As best seen in FIG. 6, each of the indexing discs 26 through 29 is provided with a plurality of openings or work piece receiving slots, as slot 32 in FIG. 6. Each of the indexing discs 26 through 29, is mounted upon the main shaft 30, as by collar means as the collar 35 mounts disc 26, to align the disc openings or work piece receiving slots. A series of work piece receiving slots 31, 32, 33 and 34 of the respective discs, as seen in FIG. 2, are aligned to receive a single work piece, such as a tubing 11 in the exemplary embodiment, separated from the supply, indicated generally at 19, and deliver it to the work piece receiving zone, indicated generally at 40.

Guide means are provided to operate in cooperation with the plurality of individual indexing means to prevent individual work pieces received in the indexing discs slots from being inadvertently discharged therefrom prior to reaching the desired area or zone, indicated generally at 40. In the exempary embodiment, such guide means includes the axially spaced generally cylindrical guides 36 and 37. Guides 36 and 37 are slotted at the top to receive the axially spaced ends of the work pieces, tubes 11 in the exemplary embodiment and, as best seen in FIG. 6, prevent such tubular work pieces, as tubular work piece 11', from being inadvertently discharged from the indexing means or discs 26 through 29 until the work piece has been delivered to a gravity drop location, indicated generally at 38 wherein the aligned indexing discs slots carrying such work piece have moved into a fully inverted or upsidedown position. In the exemplary embodiment, each of the guide means 36 and 37 is provided with a discharge ramp, as the ramp 39 of guide 37 as seen in FIG. 6. Such guide ramps, as ramp 39, facilitate the delivery of individual work pieces to the work piece receiving zone, indicated generally at 40, although, it is contemplated that the indexing means could merely drop the individual work pieces from the drop zone, indicated generally at 38, to the work piece receiving zone.

Figure 10:
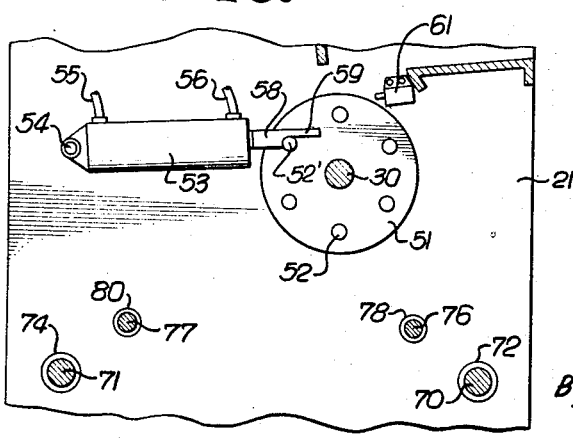
FIG. 10 is a detail view of a portion of the apparatus of FIG. 8 showing a portion of the feed means of the apparatus in a position prior to being actuated into the position of FIG. 8.

Indexing drive means are provided for driving the aforedescribed indexing means in an intermittent motion. Such indexing drive means, in the exemplary embodiment, are indicated generally at 50 and are best seen in FIGS. 8 and 10. The exemplary drive means includes a drive disc 51 mounted upon main shaft 30 in fixed relation thereto for joint rotation. Drive disc 51 is provided with a plurality of studs 52 employed in intermittently driving the disc 51 and main shaft 30. Referring first to FIG. 10, a hydraulic cylinder 53 is shown pivotally mounted at 54 to the apparatus frame side flange 21. Hydraulic fluid lines 55 and 56 are provided in conventional manner for driving the hydraulic cylinder piston rod inwardly or outwardly of cylinder 53, in conventional manner. The free end of rod 57 is provided with a rod end member 58 adapted to abut and drive each of the studs 52 in succession. Rod end member 58 is provided with an overhanging finger portion 59 which overlies a contacted stud and a concave mating surface 60 which contacts and matingly abuts with the successive studs. When hydraulic fluid is introduced through line 55 into cylinder 53 under pressure, the rod 57 is forced outwardly thereof and the rod end 58, abutting stud 52' in FIG. 10, drives the drive disc 51 in clockwise direction from the position of FIG. 10 to that of FIG. 8. Drive disc 51 in turn drives shaft 30 and the indexing means axially mounted thereon. The individual studs 52 are aligned with the longitudinally aligned openings or work piece receiving slots of the indexing means so that rotation of a drive stud, as stud 52' in FIG. 10, to the position shown in FIG. 8 causes a corresponding rotation of the indexing means and the intermittent movement of individual work pieces successively toward the drop zone, indicated generally at 38, and the work piece receiving zone, indicated generally at 40.

The indexing means discs 26, 27, 28 and 29 may each be constructed to allow adjustability of the size of the work piece receiving slots 31, 32, 33 and 34 to receive different sizes of work pieces, or tubing in the exemplary embodiment. One manner of providing for such adjustability of the disc slots is to provide the individual discs in two disc parts, 1 and 2 as seen in FIGS. 15 and 16, each part being a disc with relatively wide slots 3 and 3'. By adjustably misaligning the slots of the two assembled disc parts the effective slot width of the assembled disc slots can be varied. Pin 4 and bolt 5 may be employed to hold the disc parts in position through the alignable holes 6 in part 1 and 7 in part 2.

When the indexing means and drive discs have been rotated from the position of FIG. 10 to the position of FIG. 8, delivering a work piece, the overhanging finger 59 on the rod end member 58 contacts the micro-switch 61, which may be mounted to the apparatus frame side flange 21. Actuation of micro-switch 61 causes a reversal of the hydraulic cylinder means and a reversal of movement of rod 57 and rod end 58. The overhanging finger member 59 may slide along the top of stud 52' in FIG. 8 until the rod end drops onto the next successive stud, as stud 52'' preparatory to the next intermittent driving movement of the hydraulic cylinder means, including cylinder 53, and the drive disc 51.

The exemplary work piece feeding apparatus is intended for use in feeding individual tubes or elongate work pieces into a conventional swaging machine, indicated generally at 10. A work piece holding assembly is provided in the apparatus for grasping or holding the work piece while it is being acted upon by the swaging machine. Such work piece holding assembly, in the exemplary embodiment, is indicated generally at 65 and includes a pair of opposed separable jaw assemblies 66 and 67. As seen in FIGS. 6 and 7, the jaw assemblies 66 and 67 are positioned to operate adjacent the work piece receiving zone, indicated generally at 40, and move the separable jaws 68 and 69 into the zone to grasp or hold a work piece delivered into such zone.

Jaw assemblies 66 and 67 are slidably mounted upon the apparatus frame or bed rods 70 and 71 for moving a held tubing or work piece 11'' from the position of FIG. 3 into the swaging machine as shown in FIG. 11. Bed rods 70 and 71 are rigidly connected by collars 72, 73, 74 and 75 to the apparatus frame side flanges 21 and 22, the flange 22 being rigidly connected to the exemplary swaging machine, indicated generally at 10. Stabilizer bars or rods 76 and 77 may also be rigidly connected between the apparatus frame side flanges 21 and 22, as by collars 78, 79, 80 and 81 to stabilize the movement of the jaw assemblies 66 and 67 along the bed rods 70 and 71. Conventional guide blocks 82 and 83 may be mounted upon the jaw assemblies 66 and 67 to provide the sliding, stabilized longitudinal movement of the jaw assemblies relative to the stabilizer bars 76 and 77, under the influence of ram or driving means as subsequently described.

As best seen in FIGS. 6, 7 and 12, each of the jaws 68 and 69 are slidably mounted within the jaw assembly housings 84 and 85, respectively, with upper and lower lugs or flanges 86, 87 and 88, 89 received in housing guides or slots 90, 91 and 92, 93, respectively. The jaws 68 and 69 are also spring biased inwardly by the respective housings by the spring means including the springs 94 and 96 in housing 84 and the springs 95 and 97 in housing 85, as best seen in FIG. 12. Bearing blocks 98 and 99 are provided in the housings 84 and 85 of the jaw assemblies 66 and 67, respectively, to be abutted by stop means as subsequently described.

Power operated ram or drive means are provided for moving the work piece into the exemplary swaging machine and for power closing of the separable jaw assemblies 66 and 67. In the exemplary embodiment, a stationary saddle or frame member 100 is mounted in fixed relation to the frame or bed rods 70 and 71 as seen in FIGS. 3, 8 and 11. Bearing blocks 101 and 102 may be provided for interconnecting the stationary saddle 100 with the stabilizer bars 76 and 77, respectively. A hydraulically operated power cylinder means 103 supported by the saddle or frame member 100 includes a piston or ram rod 104 adapted to ram or push the work piece 11'' and a jaw operating movable carriage means including the carriage 105. Ram or push rod 104 is provided with a collar 106 to push against the carriage assembly 105 and a conical end 107 to engage and push tubular work pieces toward the swaging machine, indicated generally at 10. Carriage assembly 105 is slidably mounted upon the frame or bed rods 70 and 71 by journal blocks 108 and 109 fixed to the assembly. Stabilizer journal blocks 110 and 11 may be provided on the movable carriage 105 to stabilize its movement relative to the jaw assemblies 66 and 67 also journaled or stabilized to the bars 76 and 77 in addition to being mounted on the bed rods 70 and 71.

Cam plate means 112 and 113 are fixedly mounted, as by conventional bolt and nut fastener means 14, to the movable carriage assembly 105. Each plate 112 and 113 is provided with a plurality of holes 115 for adjusting their position on the movable carriage assembly 105. The free ends of the plates 112 and 113 toward the jaw assemblies 66 and 67 are provided with inclined or cam ends 116 and 117 to cam against rollers 118 and 119 mounted to the jaws 68 and 69, as best seen in FIG. 12. The jaw assemblies 66 and 67 are spring biased toward the movable carriage 105 and its cam plates 112 and 113 to normally bias the jaw assemblies together due to the camming action between plate ends 116, 117 on the jaw rollers 118, 119, respectively. Spring means 120 and 121, mounted to the carriage assembly 105, are connected to the jaw assemblies 66 and 67 as seen in FIG. 11, and in detail in FIG. 13, to provide such biasing normally closing jaws 68 and 69. As seen in FIG. 13, each jaw as jaw 68 is provided with a hoop, as hoop 220, onto which the spring means are hooked as by spring hook 221. The hoops, as hoop 220, may be embedded into the housing 84 or be provided to encircle a jaw member so that the spring bias of the associated spring means is transmitted to the entire jaw assemblies in a direction longitudinally of the apparatus, the direction the carriage assembly 105 and jaw assemblies 66 and 67 are movable on the rods 70, 71 and the bars 76, 77.

When the carriage assembly 105 is in the starting position of FIG. 3, the jaw assemblies 66 and 67 are held outwardly relative to cam plates 112 and 113, against the spring bias of springs 120 and 121 by the stop bars 122 and 123. Stop bars 122 and 123 are fixedly mounted to the stationary saddle 100 by conventional nut and bolt fasteners, as fasteners 124. The free ends of stop bars 122 and 123 abut the bearing blocks 98 and 99 provided in the jaw assembly housings 84 and 85, respectively. When the movable carriage 105 is moved to the right in FIG. 3 to the position shown in FIG. 11, the jaw assemblies 66 and 67 are carried away from the stop bars 122 and 123 allowing closure of the jaws 68 and 69 upon the work piece 11″ under the action of springs 120 and 121. The hydraulic cylinder 103 and ram rod 104 may be actuated by a controllable source of hydraulic fluid under pressure in conventional manner, as by an electric motor and hydraulic pump means indicated generally at 125 in FIGS. 1 and 2, and schematically in FIG. 17 as M and P, respectively. A fluid reservoir R is provided and a plurality of check valves V may be employed to maintain fluid pressure and the cylinders 103, 53 and 141 through conventional fluid lines and solenoid means $S_1$, $S_2$ and $S_3$ operating pilot valves $PV_1$, $PV_2$ and $PV_3$ respectively.

Positioning means are provided for receiving and holding a work piece in the zone, indicated generally at 40 in FIG. 6, while the jaw assemblies 66 and 67 are operated to a closed position during actuation of the ram or power means previously described. Such positioning means, in the exemplary embodiment, are indicated generally at 130 in FIGS. 2 and 6. As best seen in FIG. 2, the exemplary positioning means includes a horizontal rotatably mounted bar or shaft 131 rotatably journaled in collars 132 and 133 on the apparatus side frame flanges 21 and 22. A pair of arms 134 and 135 are provided with concave work receiving support members 136 and 137 at their outer ends, respectively, and are fixedly mounted by collars 138 and 139 to the shaft or rod 131. As best seen in FIG. 6, the arms 134 and 135 include a generally right angle bend therein so that the major portion of each arm, when in the active position of FIG. 6, is below the path of travel of jaw assembly 67 while the vertical end portion, 135′ in FIG. 6, extends upwardly into the work piece receiving zone between the jaw assemblies, indicated generally at 40. Each of the positioning means arms 134 and 135 is thus adapted to act in the zone indicated generally at 40 for receiving a work piece, as work piece 11″ in FIGS. 3 and 6, and positioning such individually delivered work piece in the work piece receiving zone ready to be grasped or held by the jaw assemblies.

Figure 9:
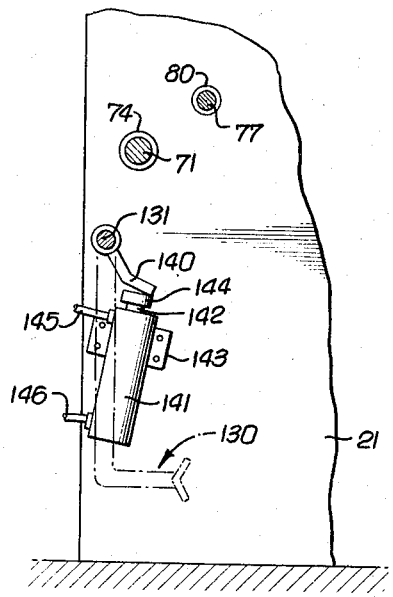
FIG. 9 is a detail view of a portion of the apparatus of FIG. 8 showing a portion of the exemplary positioning means in a lowered or out-of-the-way position.

The positioning means, in the exemplary embodiment, is movable between an active position, as seen in FIGS. 3 and 6, to an inactive position, as seen in FIGS. 2, 11 and 9, out of the way of the moving carriage assembly 105 and jaw assemblies. The positioning means shaft 131 is rotatably mounted in the journal or collar means 132 and 133 mounted to the apparatus frame side flanges 21 and 22, respectively. An arm or lever extends laterally of shaft 131 adjacent the end thereof journaled in collar 132, as best seen in FIGS. 8 and 9. Hydraulic cylinder means including the cylinder 141 and piston rod 142 are mounted by a conventional bracket means 143 to the apparatus frame side flange 21. A plate 144 on the free end of piston rod 142 is adapted to engage the lever 140 and to move it, rotating positioning means shaft 131, between the positions of FIGS. 8 and 9 upon selective introduction of hydraulic fluid into the cylinder 141 through the hydraulic fluid lines 145 and 146. When the positioning means, indicated generally at 130, is in the inactive position of FIGS. 2, 9 and 11, the application of fluid under pressure through line 146 into cylinder 141 will cause piston rod 142 to move lever 140 upwardly in FIG. 9 to the position of FIG. 8. Such movement of lever 140 causes a rotation of shaft 131 and the consequent raising of the positioning arms 134 and 135 from the inactive position of FIGS. 2 and 9 to the active position of FIGS. 3 and 8. The plate 144 on the free end of rod 142 is provided to allow limited lateral movement of shaft 131 and the lever 140, for a purpose subsequently described, without allowing lever 140 to lose its contact with the piston rod. The actuation of hydraulic cylinder 141 to move the positioning means into an active position will be described in the over-all operation of the apparatus subsequently described herein.

Automatic control means, for providing movement of the positioning means, indicated generally at 130, to the inactive position, in the exemplary embodiment, includes the provision of a switch means indicated generally at 150 in FIGS. 2, 3, 5 and 11 to be actuated by movement of the jaw assemblies 66 and 67. As best seen in FIG. 5, a conventional air or pneumatic switch means 151 may be mounted to the stationary saddle 100. As seen in FIG. 17, conventional air lines may connect a compressor c, driven by motor $M_1$, with an air actuated control AC, mechanically connected to solenoid $S_3$ and pilot valve $PV_3$. A cam means 152 is mounted on an arm 153 mounted to the jaw assembly 67 by conventional bolt fastening means 154. When the jaw assembly 67 is moved toward the exemplary swaging machine, to the right in FIG. 3 toward the position of FIG. 11, the cantilevered cam means 152, as seen in FIG. 5, passes over and depresses the switch actuator 155. Depression of actuator 15 by the cam 152 opens the switch means 151 to release air pressure in line 156. The air operated control means AC in FIG. 17 reverses the pilot valve $PV_3$ and hydraulic cylinder 141 lowers the positioning means arms 134 and 135 from the active positions of FIGS. 3 and 6 to the inactive positions of FIGS. 2 and 9.

Figure 14:
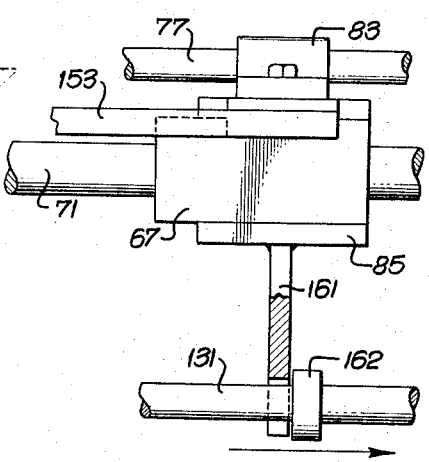
FIG. 14 is a detail view of a portion of the apparatus of FIG. 11 taken therein along the plane XIV—XIV.

As previously described, actuation of the ram or push rod 104 causes movement of the carriage 105 and jaw assemblies 66 and 67 to the right in FIGS. 3 and 11 toward the exemplary swaging machine, the jaws 68 and 69 closing on the exemplary work piece 11″ and moving it into the swaging machine. Such movement automatically actuates the switch means, indicated generally at 150, to move the exemplary positioning means into an inactive position allowing passage of the jaw assemblies thereby. The operation of the ram or push rod means, including rod 104 and 103 under the influence of the motor and hydraulic pump means indicated generally at 125 is reversed, in the exemplary embodiment by the micro-switch means 160. As best seen in FIGS. 6 and 14, a depending plate 161 is mounted to the bottom of the housing 85 of jaw assembly 67. Movement of the jaw assembly 67 toward the exemplary swaging means, indicated generally at 10, causes depending flange 161 to abut the collar 162 fixed upon positioning means shaft 131. Such abutment of flange 161 with collar 162 causes a lateral shifting of the main shaft 131 relative to the collars 132 and 133, causing a rod end 163 of shaft 131 to abut and actuate micro-switch 160. The shaft 131 may be spring biased to resume its normal position, as seen in FIGS. 1 through 3 from the actuated position of FIG. 11. Micro-switch 160 may be connected by an electrical lead line 164 as seen in FIG. 17 to an electrical control means as solenoid $S_1$ for reversing the operation of the hydraulic ram or power means including the cylinder 103 and piston rod 104 by a pilot valve $PV_1$.

Guide means are provided below the work piece receiving zone to guide work pieces discharged from the holding assembly, including jaw assemblies 66 and 67 in the exemplary embodiment, away from the apparatus into a work holding bin or receptacle, indicated generally at 170 in dotted line in FIG. 6. In the exemplary embodiment, such guide means include the spaced angle iron guides 171 and 172, as best seen in FIGS. 2, 3 and 11. Guide 171 may be supported in an inclined position from the stationary saddle 100 by a pair of support arms 173 and 174. Guide 172 may be mounted from the apparatus frame end flange 22. As best seen in FIGS. 4, 6 and 7, the guides 171 and 172 are inclined and extend from a position directly below the work piece receiving zone, indicated generally at 40, downwardly toward a work receiving zone in which a bin or receptacle may be placed, as indicated generally at 170 in FIG. 6. During the reversal or withdrawal of the power or ram means, including the push rod 104, the jaw assemblies 66 and 67 abut stops 122 and 123 to cause release of the held work piece, which drops downwardly onto the guides 171 and 172. The work piece may then merely roll down the guides into the associated collecting bin or receptacle. As particularly contemplated within the present invention, the movement of the discharged work piece from the apparatus holding assembly to the bin or collecting receptacle is employed to recycle or actuate certain of the previously described mechanisms in order to cause the present work piece feeding apparatus to operate automatically and continuously. Accordingly, switch means are provided in the path of discharge travel of the work pieces in order to actuate the feed means, indicated generally at 25 to deliver a next successive work piece into the holding assembly and for recycling the apparatus.

In the exemplary embodiment, switch means are provided as indicated generally at 180 in FIGS. 3, 4 and 11, in the path of travel of a discharged work piece dropped from the work piece holding assembly. In the exemplary embodiment, such switch means, indicated generally at 180, is positioned directly below the work piece receiving zone indicated generally at 40 in which the positioning means and work holding assemblies, aforedescribed, operate. Referring particularly to FIG. 4, a conventional micro-switch 181 may be fastened by its flanges 182 and 183 to the underside of one of the guide members 171. Conventional bolts 184 and 185 may be employed to hold the switch flanges to the underside of angle member 171. A switch arm 185 is mounted to the upper surface of the lower arm of angle member 171 to bear against the switch button or actuator 186 which protrudes upwardly through the lower arm of member 171 through a port 187 therein.

As each individual work piece, as tubes 11 in the exemplary embodiment, are dropped from the work holding assemblies, including jaw assemblies 66 and 67 in the exemplary embodiment, the work pieces will fall upon and contact switch arm 185 which in turn will actuate the micro-switch 181. Micro-switch 181 is operably connected, as by conventional electrical means shown schematically in FIG. 17 to an electrical control or solenoid $S_2$ for actuating, through pilot valve $PV_2$, the hydraulic means for driving cylinder 53 and piston rod 57 of the exemplary feed means in response to contact of a work piece with the switch means. Operation of cylinder 53 causes rotation of the feed means to deliver a next successive work piece into the work receiving zone, indicated generally at 40 and as previously described, with the finger extension 59 actuating micro-switch 61, as seen in FIG. 8. Micro-switch 61 is operably associated by lines 164 with the solenoid $S_1$ and pilot valve $PV_1$ interconnected with the hydraulic pump means indicated generally at 125, for actuating the powdered ram or push rod means 104 by its hydraulic cylinder 103 to move the carriage 105 on its way toward the exemplary swaging machine.

Initial movement of carriage 105 allows relative movement between the carriage 105 and jaw assemblies 66 and 67 causing closing of jaws 68 and 69 on the work piece under the spring bias of springs 120 and 121. Continued further operation of the movable carriage 105 causes contact between the cam 152 and the air switch indicated generally at 150, causing the movement of the positioning means, indicated generally at 130, to the inactive position of FIGS. 2 and 9.

The completion of the swaging operation occurs on the further movement of the carriage 105 and jaw assemblies 66 and 67 to the right in FIG. 11 when the depending flange 161 contacts collar 162 and shifts the shaft 131 to the right in FIG. 11, causing rod end 163 to actuate micro-switch 160. Such actuation of switch 160 causes actuation of the solenoid $S_1$ hydraulic fluid pilot valve $PV_1$ and a reversal of the movement of the carriage 105 and jaw assemblies. Such reverse movement of the jaw assemblies withdraws the work piece 11" from the exemplary swaging machine. Upon abutment of bearing blocks 98 and 99 on the stop bars 122 and 123, the jaw assemblies are held against the bias of springs 120 and 121 during continued withdrawal of the cam plates 112 and 113 relative to the jaw rollers 118 and 119. Jaws 68 and 69 are thereby separated and the work piece is discharged or dropped downwardly of the zone indicated generally at 40.

The discharge of a work piece from the work holding assembly causes the work piece to actuate the switch means indicated generally at 180. Actuation of the micro-switch 181 causes the operation of cylinder 53 and thus a recycling of the feeding apparatus. Further, in the exemplary embodiment, the switch 181 is also associated with the positioning means, indicated generally at 130, to move it from the inactive position of FIGS. 2 and 9 to the active position of FIGS. 3, 6 and 8. Switch 181 may be connected to conventional electrical control or solenoid means $S_3$ for actuating the pilot valve $PV_3$ connecting the hydraulic piston and cylinder means, including cylinder 141 and the piston rod 142 employed in the exemplary embodiment, for actuating the lever 140 and the associated positioning means shaft 131.

In the exemplary embodiment, therefore, the discharge of a work piece from the work holding assembly causes the feed means, indicated generally at 25, to move a next successive work piece into the work piece receiving zone 40 and the movement of the work piece positioning means, indicated generally at 130, into position to receive and hold the work piece prior to its being grasped or held by the holding assembly. Preferably, the hydraulic means 141 is adapted to move the work positioning means, including arms 134 and 135, into position before the next work piece is dropped into the work positioning zone due to the action of hydraulic cylinder means 53.

From the foregoing detailed explanation of an exemplary embodiment of the work piece feeding apparatus, according to the present invention, it can be seen that the foregoing objects have been attained by the present invention. The work piece such as a tube or bar stock piece is automatically separated by the exemplary indexing means from a supply thereof and delivered into a work piece receiving zone where it is caught and positioned by the exemplary positioning means. The positioning means automatically drops to an out-of-the-way position as the jaw assemblies move the work piece into the exemplary swaging machine under the influence of the powered ram. The automatic discharge of the work piece from the work holding assembly or jaw assemblies causes the automatic recycling or initiation of the next feeding operation. As the finished work piece drops onto the exemplary guide means, it closes the switch 185 and thereby automatically causes the next successive work piece to be delivered into the work piece receiving zone and thus the continued operation of the overall apparatus or system. In the preferred exemplary embodiment, the discharged work piece, in contacting the switch 185 in its discharge path of travel, also reactivates the positioning means into its operable position in the work piece receiving zone to receive the next work piece being fed thereto, also because of the action of the finished work piece hitting or contacting the switch means 185. It is therefore unnecessary for an operator to be constantly present to manually position or direct successive work pieces into the jaw assemblies or work piece holding assembly preparatory to the automatic feeding into the exemplary swaging machine. The operator is thereby freed to oversee the operation of a plurality of such work piece feeding apparatus or systems operating in association with material working machines such as the exemplary swaging machine indicated generally at 10.

Having thus described an exemplary embodiment of the work piece feeding apparatus or system for automatically feeding individual work pieces in succession from a non-segregated supply thereof to a work piece holding assembly of a machine to act thereon in response to the discharge of finished or completed work pieces, it should be apparent to those skilled in the art that various modifications, adaptations or alterations of the present embodiment can be made which may come within the scope of the present invention which is described and limited only by the following claims.

I claim:
1. A work piece feeding apparatus for automatically feeding individual work pieces in succession from a non-segregated supply thereof to a machine to act upon said work pieces and for discharging said work pieces from said machine, said apparatus comprising:
feed means for separating a work piece from a supply thereof and for delivering said piece individually into a work piece receiving zone of said apparatus;
positioning means for receiving and positioning such individually delivered work piece within said zone;
said positioning means being movable between an active position in said zone and an inactive position out of said zone;
a movable work piece holding assembly for grasping a work piece on said positioning means and for holding said work piece on movement of said positioning means to an inactive position;
power operated drive means for moving said assembly relative to an associated machine which acts upon a work piece held by said holding assembly and for returning said work piece to said zone;
means for operating said holding assembly to discharge a work piece therefrom on return of said work piece to said zone;
guide means below said zone to guide work pieces discharged from said holding assembly away from said apparatus; and
switch means associated with said feed means and guide means for operating said feed means to deliver a next successive work piece into said zone in response to being engaged by a prior work piece discharged from said assembly toward said guide means.

2. An apparatus as in claim 1 wherein:
automatic control means are provided for moving said positioning means to said inactive position after a work piece is grasped by said holding assembly; and
said switch means associated with said feed means and guide means is also associated with said automatic control means to return said positioning means to said active position in response to being engaged by said prior work piece discharged toward said guide means before said next successive work piece is delivered said zone.

3. A work piece feeding apparatus for automatically feeding individual work pieces from a supply thereof to a jaw assembly of a machine to act upon such work pieces, said apparatus comprising:
feed means for delivering individual work pieces from a supply thereof separately into a zone between said jaws;
support means for receiving each of said work pieces separately delivered into said zone between said jaws and for supporting each of such work pieces in a position in which said jaws may close thereon; and
switch means placed in a path of travel of work pieces discharged from said jaws for actuating said feed means to deliver a next successive work piece to said zone as soon as it is engaged by a prior work piece discharged from said machine jaw assembly.

4. The apparatus of claim 3 wherein:
means are provided for moving said support means to an inactive position away from said zone to allow movement of the jaw assembly thereby after closure of said jaws on a supported work piece; and
control means are provided in association with said support moving means and said switch means to reverse said support moving means upon travel of a discharged work piece past said switch means to place said support means back in an active position adjacent said zone ready to receive and support a work piece delivered into said zone.

5. In an automatic feed apparatus for use in rapidly feeding tubing to a swaging machine, or the like, including a separable jaw assembly to grasp a tube, means for closing said jaws upon a tube positioned therebetween and powered means for moving said jaw assembly toward said machine, the provision of:
tubing feed means immediately above said jaw assembly for receiving tubing from a tubing supply and for feeding each tube into a feed zone generally parallel to and in between separated jaws of said jaw assembly;
tubing positioning means in said feed zone for receiving a tube from said feed means and for holding said tube between said jaws during closure of said jaw assembly;
means for moving said tubing positioning means to an inactive position upon said closure, said tubing being discharged from said jaw assembly past said positioning means after said swaging operation; and
switch means in a discharge zone to be actuated by a discharged tube for actuating said tubing drop means and for actuating said means for moving said tubing positioning means to return it to said feed zone to receive a next tubing being delivered by said tubing drop means.

References Cited
UNITED STATES PATENTS

| | | | |
|---|---|---|---|
| 1,619,971 | 3/1927 | Dean | 221—239 |
| 2,820,573 | 1/1958 | McConnell | 221—239 X |
| 2,878,962 | 3/1959 | Chaney et al. | 221—175 |

STANLEY H. TOLLBERG, *Primary Examiner.*